US012607265B2

(12) United States Patent (10) Patent No.: US 12,607,265 B2
Ikeda (45) Date of Patent: Apr. 21, 2026

(54) SEAL STRUCTURE AND SEALING METHOD

(71) Applicant: NOK CORPORATION, Tokyo (JP)

(72) Inventor: Atsushi Ikeda, Ibaraki (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/283,988

(22) PCT Filed: Mar. 28, 2022

(86) PCT No.: PCT/JP2022/014848
§ 371 (c)(1),
(2) Date: Sep. 25, 2023

(87) PCT Pub. No.: WO2022/210480
PCT Pub. Date: Oct. 6, 2022

(65) Prior Publication Data
US 2024/0167570 A1 May 23, 2024

(30) Foreign Application Priority Data
Mar. 30, 2021 (JP) ................................. 2021-056971

(51) Int. Cl.
*F16J 15/56* (2006.01)
*F16J 15/16* (2006.01)
(52) U.S. Cl.
CPC ............. *F16J 15/56* (2013.01); *F16J 15/164* (2013.01)
(58) Field of Classification Search
CPC ......... F16J 15/164; F16J 15/3256; F16J 15/56
See application file for complete search history.

(56) References Cited

U.S. PATENT DOCUMENTS 2,434,484 A * 1/1948 Chambers, Jr. ...... F16J 15/3212
277/553
2,750,212 A * 6/1956 Skinner ................ F16J 15/3212
277/577
(Continued)

FOREIGN PATENT DOCUMENTS

JP 2001-065703 A 3/2001
JP 2003-113780 A 4/2003
(Continued)

OTHER PUBLICATIONS

International Search Report issued in PCT/JP2022/014848, mailed Jun. 14, 2022; ISA/JP (4 pages).
(Continued)

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A sealing device is arranged between a high-pressure space and a low-pressure space next to each other along an axial direction of a rod, and seals a gap between an outer circumferential surface of the rod and an inner circumferential surface of a housing through which the rod can be inserted. The sealing device has an annular member mounted to the housing and a seal member, at which the seal member is mounted to the annular member, projects toward the outer circumferential surface of the rod, and is contactable with the outer circumferential surface of the rod. The seal member has an outer circumferential portion arranged radially outwardly and an inner circumferential portion arranged radially inwardly. The seal member is deformable in a curved shape such that a portion contactable with the outer circumferential surface of the rod projects
(Continued)

toward the low-pressure space in the axial direction of the rod.

7 Claims, 5 Drawing Sheets

(56) References Cited

U.S. PATENT DOCUMENTS

| | | | |
|---|---|---|---|
| 3,951,478 A * | 4/1976 | Olsen ................... | F16J 15/3236 |
| | | | 384/130 |
| 5,975,538 A * | 11/1999 | Krause ................... | F16J 15/322 |
| | | | 277/584 |
| 11,512,778 B2 * | 11/2022 | Jordan ................... | F16J 15/164 |
| 2003/0020240 A1 | 1/2003 | Suzuki | |
| 2013/0119611 A1 | 5/2013 | Kofler | |
| 2014/0064936 A1 * | 3/2014 | Barth ................... | F16J 15/3248 |
| | | | 415/170.1 |
| 2020/0300364 A1 | 9/2020 | Eguchi | |
| 2022/0205538 A1 | 6/2022 | Eguchi | |

FOREIGN PATENT DOCUMENTS

| | | |
|---|---|---|
| JP | 2015-203491 A | 11/2015 |
| WO | 2019/073808 A1 | 4/2019 |
| WO | 2020-250613 A1 | 12/2020 |

OTHER PUBLICATIONS

Extended European Search Report for corresponding European Patent Application No. 22780691.6 dated Feb. 24, 2025 (10 Pages).

* cited by examiner

Y

SEAL STRUCTURE AND SEALING METHOD

CROSS REFERENCE TO RELATED APPLICATIONS

This application is a U.S. National Phase Application under 35 U.S.C. 371 of International Application No. PCT/JP2022/014848, filed on Mar. 28, 2022, which claims priority to Japanese Patent Application No. 2021-056971, filed on Mar. 30, 2021. The entire disclosures of the above applications are expressly incorporated by reference herein.

BACKGROUND

Technical Field

The present disclosure relates to a sealing device.

Related Art

A sealing device is known for sealing a gap between a shaft and a housing that move relative to each other (for example, see Japanese Patent Application Laid-Open Publication No. 2015-203491). The sealing device has a metal ring having a cylindrical portion that is in close contact with an inner circumferential surface of a shaft hole of the housing and a resin seal made of a plate-shaped and ring-shaped resin member.

An outer circumferential portion of the resin seal provided in the sealing device according to a conventional technique is fixed to the metal ring. An inner circumferential portion of the resin seal is in contact with an outer circumferential surface of a shaft in a slidable manner, with the inner circumferential portion being deformed to be in a curved shape. If the shaft rotates at a high speed in a state described above, the temperature of the resin seal may excessively increase due to friction between the resin seal and the shaft. Accordingly, an object of the present disclosure is to suppress excessive increase in temperature of the seal member caused by friction while maintaining sealing performance.

SUMMARY

A seal structure according to the present disclosure includes a rotatable rod; a housing with an opening through which the rod is inserted; and a sealing device arranged between a high-pressure space and a low-pressure space next to each other along an axis of the rod inside the housing, and configured to seal a gap between an outer circumferential surface of the rod and an inner circumferential surface of the opening. The sealing device includes an annular member mounted to the housing, and an annual seal member fixed to the annular member, the seal member has an inner circumferential portion adjacent to the rod, and the inner circumferential portion is curved toward the low-pressure space, and a sealing surface of the inner circumferential portion in the curved state, the sealing surface facing the rod, is in contact with the outer circumferential surface of the rod.

A sealing method according to the present disclosure uses a rotatable rod, a housing with an opening through which the rod is to be inserted, and a seal member arranged between a high-pressure space and a low-pressure space next to each other along an axial direction of the rod inside the housing, the seal member having an inner circumferential portion adjacent to the rod. The sealing method includes, in a case in which a pressure inside the high-pressure space is below a reference value, sealing a gap between an outer circumferential surface of the rod and an inner circumferential surface of the opening by maintaining the seal member in a state in which, of the seal member, the inner circumferential portion adjacent to the rod is curved toward the low-pressure space, and in which a sealing surface of the inner circumferential portion in the curved state, the sealing surface facing the rod, is in contact with the outer circumferential surface of the rod, and in a case in which the pressure inside the high-pressure space exceeds the reference value, separating the sealing surface from the outer circumferential surface of the rod by pressing the sealing surface of the inner circumferential portion by way of the pressure inside the high-pressure space.

DETAILED DESCRIPTION

Figure 1:
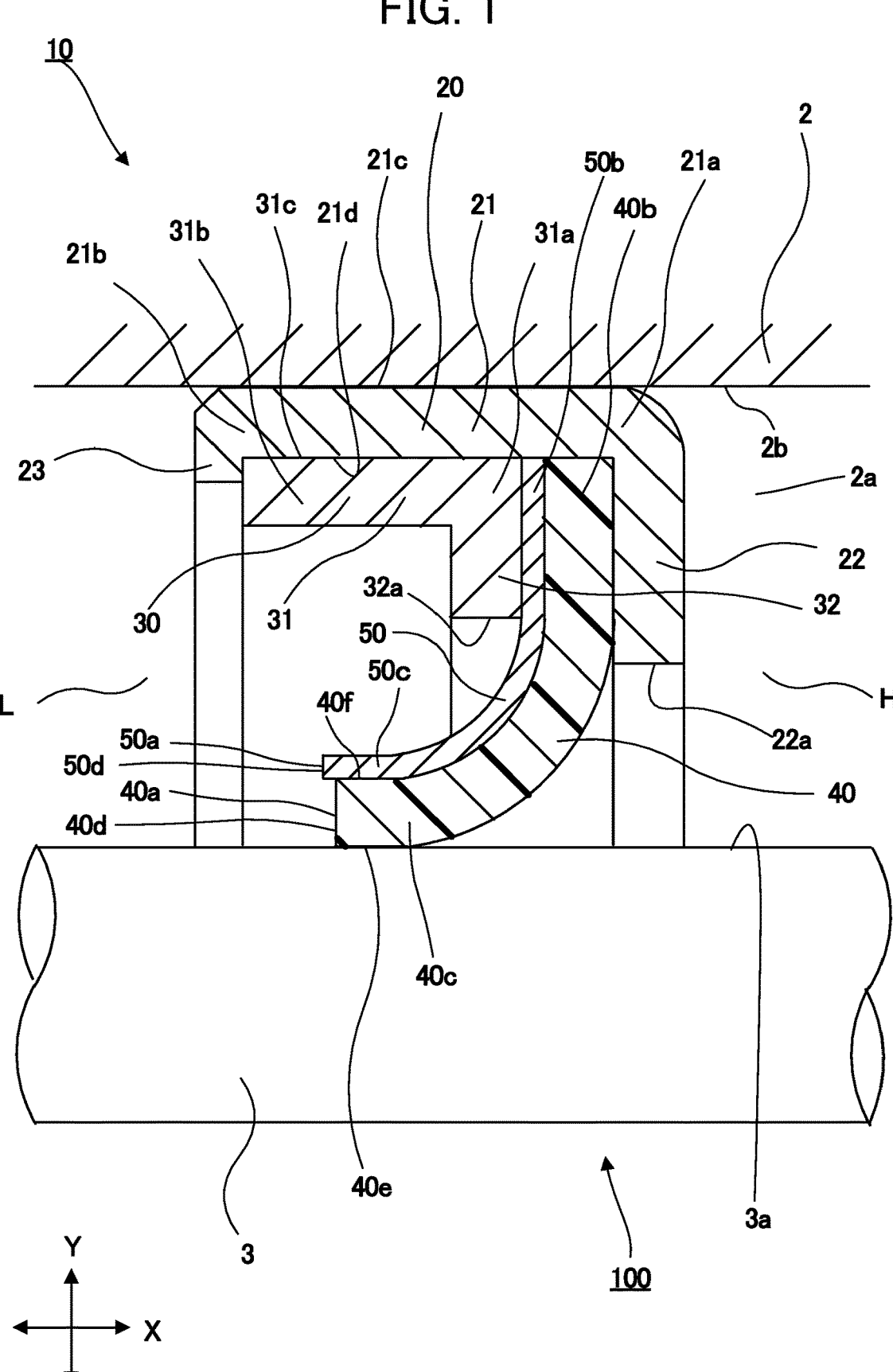
FIG. 1 is a partial cross-sectional view of a sealing device mounted to a rod.

An embodiment of the present disclosure is described below with reference to the drawings. The dimensions and scales of parts in the drawings are different from the actual ones as appropriate. The embodiment described below includes preferred examples of the present disclosure. Therefore, various technically preferable limitations are added to the present embodiment. However, the scope of the present disclosure is not limited to these forms unless specifically stated in the following description to limit the present disclosure.

Figure 2:
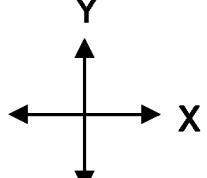
FIG. 2 is a partial cross-sectional view of the sealing device.
Figure 3:
FIG. 3 is a front view of the sealing device.

FIG. 1 illustrates a partial cross-sectional view of a seal structure 100 according to the embodiment. The seal structure 100 is used in various apparatuses such as a compressor for compressing gas, for example. The seal structure 100 has a housing 2, a rod 3, and a sealing device 10. FIG. 2 illustrates a partial cross-sectional view of the sealing device 10. FIG. 3 illustrates a front view of the sealing device 10. In each figure, an axial direction X and a radial direction Y are indicated by arrows. FIGS. 2 and 3 illustrate the sealing device 10 in a state prior to being mounted to the rod 3. FIG. 3 illustrates a surface of the sealing device 10 facing a low-pressure space L.

The sealing device 10 is arranged in a gap between an inner circumferential surface 2b of an opening 2a of the housing 2 and an outer circumferential surface 3a of the rod 3. The housing 2 may be part of a rotating machine, for example. The opening 2a is a circular opening. The rod 3 is a rotating shaft that is inserted into an interior of the opening 2a of the housing 2. The rod 3 rotates about the axis. The rod 3 is rotatably supported by bearings (not shown). The housing 2 and the rod 3 are arranged coaxially. The sealing device 10 seals the gap between the inner circumferential surface 2*b* of the housing 2 and the outer circumferential surface 3*a* of the rod 3.

When the sealing device 10 is in use, one of the two adjacent spaces along the axial direction X across the sealing device 10 includes a low-pressure space L and the other space includes a high-pressure space H. In FIG. 1, the space on the left side of the sealing device 10 is the low-pressure space L, and the space on the right side of the sealing device 10 is the high-pressure space H. For example, the high-pressure space H may be an interior space of an apparatus having the seal structure 100. The low-pressure space L may be an external space of the apparatus having the seal structure 100. The low-pressure space L may be a space connected to the external space in the housing 2. The gas inside the high-pressure space H is compressed due to rotation of the rod 3. Specifically, as the rotation speed of the rod 3 increases, the gas in the high-pressure space H is compressed, resulting in increase in the pressure in the high-pressure space H. The rod 3 rotates at high speeds of 100 krpm (rotations per minute) or more, for example. When the sealing device 10 is in normal use, the pressure in the high-pressure space H is higher than the pressure in the low-pressure space L. The rotation speed of the rod 3 is not limited to the above examples. For example, the rotation speed of the rod 3 may be 5,000 rpm to 100,000 rpm.

The sealing device 10 has an outer ring 20, an inner ring 30, a seal member 40, and a plate spring 50. The outer ring 20 has a cylindrical portion 21, a flange 22, and a crimp portion 23. The cylindrical portion 21 extends along the axial direction X over a predetermined length. The cylindrical portion 21 includes ends 21*a* and 21*b* that are spaced apart from each other in the axial direction X. The flange 22 projects inwardly in the radial direction Y from the end 21*a* of the cylindrical portion 21. In other words, the flange 22 projects toward the outer circumferential surface 3*a* of the rod 3. The thickness direction of the flange 22 is along the axial direction X. The crimp portion 23 protrudes inwardly in the radial direction Y from the other end 21*b* of the cylindrical portion 21. The crimp portion 23 is formed by bending the end portion 21*b* of the cylindrical portion 21. An outer circumferential surface 21*c* of the cylindrical portion 21 includes a surface that is in contact with the inner circumferential surface 2*b* of the housing 2. The outer circumferential surface 21*c* of the cylindrical portion 21 may be in close contact with the inner circumferential surface 2*b* of the housing 2. The outer ring 20 is made of metal, for example. The metal adopted for the outer ring 20 is stainless steel. The outer ring 20 may be formed using a metal other than stainless steel, or other materials such as resin. The outer ring 20 is an example of an annular member.

The inner ring 30 has a cylindrical portion 31 and a flange 32. The inner ring 30 is arranged on an inner surface of the outer ring 20 in the radial direction Y. The inner ring 30 fits into the outer ring 20. An outer circumferential surface 31*c* of the inner ring 30 is in contact with an inner circumferential surface 21*d* of the outer ring 20. The cylindrical portion 31 has a predetermined length in the axial direction X. The length of the cylindrical portion 31 in the axial direction X is shorter than the cylindrical portion 21 of the outer ring 20 in the axial direction X. The cylindrical portion 31 includes ends 31*a* and 31*b* that are spaced apart with each other in the axial direction X. The flange 32 projects inwardly in the radial direction Y from the end 31*a* of the cylindrical portion 31. The thickness direction of the flange 32 is along the axial direction X. The flange 32 is arranged adjacent to the flange 22 of the outer ring 20 in the axial direction X. The position in the axial direction X of the other end portion 31*b* of the cylindrical portion 31 is defined by the crimp portion 23 of the outer ring 20. The end portion 31*b* of the cylindrical portion 31 is in contact with the crimp portion 23 in the axial direction X. The outer circumferential surface 31*c* of the cylindrical portion 31 includes a surface that is in contact with the inner circumferential surface 21*d* of the cylindrical portion 21 of the outer ring 20. The inner ring 30 is a member for fixing the seal member 40 to the outer ring 20, and is an example of a mounting member.

The seal member 40 is an annular, plate-shaped member. An opening 40*a* is formed in the center of the seal member 40. The rod 3 is inserted into the opening 40*a*. With the rod 3 not inserted in the opening 40*a*, the inner diameter thereof is smaller than the outer diameter of the rod 3. Of the seal member 40, a portion 40*b* (hereinafter referred to as "outer circumferential portion") adjacent to the housing 2 includes a portion mounted to the outer ring 20. The outer circumferential portion 40*b* is an annular portion that includes an outer circumference of the seal member 40. The thickness direction of the outer circumferential portion 40*b* of the seal member 40 is along the axial direction X. The outer circumferential portion 40*b* of the seal member 40 is fixed between the flange 22 of the outer ring 20 and the flange 32 of the inner ring 30 in the axial direction X. The seal member 40 together with the plate spring 50 is sandwiched between the flange 22 and the flange 32.

The outer circumferential portion 40*b* of the seal member 40 is arranged between the flange 22 of the outer ring 20 and the flange 32 of the inner ring 30 in the axial direction X. The flange 22 of the outer ring 20 is arranged closer to the high-pressure space H than the outer circumferential portion 40*b* of the seal member 40. The flange 32 of the inner ring 30 is arranged closer to the low-pressure space L than the outer circumferential portion 40*b* of the seal member 40.

The flange 22 of the outer ring 20 projects toward the outer circumferential surface 3*a* of the rod 3 more than the flange 32 of the inner ring 30. In other words, the inner circumferential surface 22*a* of the flange 22 is closer to the outer circumferential surface 3*a* of the rod 3 than the inner circumferential surface 32*a* of the flange 32.

The seal member 40 has an inner circumferential portion 40*c*. The inner circumferential portion 40*c* is an annular portion adjacent to the rod 3 in the seal member 40. In other words, the inner circumferential portion 40*c* is an annular portion that includes an inner circumference of the seal member 40. When the sealing device 10 is in use, the inner circumferential portion 40*c* projects toward the low-pressure space L. In the cross-section shown in FIG. 1, the inner circumferential portion 40*c* of the seal member 40 is curved toward the low-pressure space L. With the rod 3 being inserted in the opening 40*a*, the inner circumferential portion 40*c* may be in a cylindrical shape. In the above state, an inner side surface 40*e* (hereinafter referred to as "sealing surface") of the inner circumferential portion 40*c* in the radial direction Y is in contact with the outer circumferential surface 3*a* of the rod 3. The sealing surface 40*e* of the inner circumferential portion 40*c* may be in close contact with the outer circumferential surface 3*a* of the rod 3. The sealing surface 40*e* is a surface of the inner circumferential portion 40*c* that is curved toward the low-pressure space L, and the sealing surface 40*e* faces the rod 3. The shape of the seal member 40 is not limited to a disk shape. The seal member 40 may include a plurality of plate-shaped pieces, for example.

The seal member 40 is made of resin, for example. The resin used for the seal member 40 is PTFE (polytetrafluoroethylene). This PTFE has excellent heat resistance, pressure resistance, and chemical resistance. The PTFE has low sliding wear. The seal member 40 has flexibility and elasticity. The seal member 40 is not limited to resin and may be formed of other materials such as rubber.

The plate spring 50 has a disk shape. An opening 50a is formed in the center of the plate spring 50. As shown in FIG. 2, with the sealing device 10 is not mounted to the rod 3, an inner diameter of the opening 50a is smaller than an inner diameter of the opening 40a of the seal member 40. The inner diameter of the opening 50a may be larger than or equal to the inner diameter of the opening 40a of the seal member 40.

An outer circumferential portion 50b of the plate spring 50 is mounted to the outer ring 20. The direction of thickness of the outer circumferential portion 50b of the plate spring 50 is along the axial direction X. In the axial direction X, the outer circumferential portion 50b of the plate spring 50 is arranged between the outer circumferential portion 40b of the seal member 40 and the flange 32 of the inner ring 30. As described above, the seal member 40 and the plate spring 50 are sandwiched between the flange 22 and the flange 33. Thereby, the seal member 40 and the plate spring 50 are mounted to the outer ring 20 and the inner ring 30. The plate spring 50 is arranged closer to the low-pressure space L than the seal member 40, and is in contact with the seal member 40.

As shown in FIG. 3, in the plate spring 50, there is formed a plurality of slits 51 extending radially in the radial direction Y from the opening 50a. The slits 51 penetrate the plate spring 50 in the thickness direction.

When the sealing device 10 is in use, a portion 50c (hereinafter referred to as "inner circumferential portion") adjacent to the rod 3 in the plate spring 50 projects toward the low-pressure space L. In the cross section shown in FIG. 1, the inner circumferential portion 50c of the plate spring 50 is curved toward the low-pressure space L. In other words, the plate spring 50 is curved along the curve of the seal member 40. When the sealing device 10 is in use, the inner circumferential surface 50d of the opening 50a of the plate spring 50 projects farther toward the low-pressure space L than the inner circumferential surface 40d of the opening 40a of the seal member 40. The inner circumferential surface 40d is an end surface of the seal member 40 and faces the low-pressure space L when the sealing device 10 is in use. The inner circumferential surface 50d is an end surface of the plate spring 50 and faces the low-pressure space L when the sealing device 10 is in use.

When the sealing device 10 is in use, the plate spring 50 presses the inner circumferential portion 40c of the seal member 40 toward the radially inner direction Y with the plate spring 50 curved along the seal member 40. The inner circumferential portion 40c of the seal member 40 is pressed against the outer circumferential surface 3a of the rod 3. The sealing surface 40e of the seal member 40 is in contact with the outer circumferential surface 3a of the rod 3. The sealing surface 40e of the seal member 40 may be in close contact with the outer circumferential surface 3a of the rod 3.

The operation of the sealing device 10 will now be described. The rod 3 is inserted into the opening 40a of the seal member 40 from a space adjacent to the high-pressure space H in the sealing device 10. As described above, the outer diameter of the rod 3 is larger than the inner diameter of the seal member 40. Accordingly, as the rod 3 is inserted, the inner circumferential portion 40c is pushed by the rod and is bent toward the low-pressure space L. In other words, the inner circumferential portion 40c of the seal member 40 is brought into contact with the outer circumferential surface 3a of the rod 3, and projects toward the low-pressure space L. When the sealing device 10 is in use, the sealing surface 40e of the inner circumferential portion 40c can function as a lip seal that is in contact with the outer circumferential surface 3a of the rod 3. A contact surface between the outer circumferential surface 3a of the rod 3 and the sealing surface 40e of the seal member 40 has a predetermined length in the axial direction X of the rod 3.

The rod 3 is movable relative to the housing 2 in the X-axis direction. The rod 3 rotates about the axis. The inner circumferential portion 40c of the seal member 40 is pressed to the outer circumferential surface 3a of the rod 3 from the radially outer direction Y by the plate spring 50. The sealing surface 40e of the seal member 40 is in contact with the outer circumferential surface 3a of the rod 3. An elastic restoring force of the seal member 40 itself and a pressing pressure by the plate spring 50 maintain a sealing performance.

In this embodiment, the rod 3 rotates at a high speed, for example, 100 krpm or higher, with the sealing surface 40e in contact with the outer circumferential surface 3a of the rod 3. The seal structure 100 according to this embodiment operates in a poorly lubricated environment. The poorly lubricated environment is an environment in which no lubricant exists or one in which the amount of lubricant is sufficiently small. In a configuration in which the rod 3 rotates at a high speed in a poorly lubricated environment, if the rod 3 and the seal member 40 are constantly in contact with each other, the temperature of the seal member 40 might increase excessively by friction generated between the rod 3 and the seal member 40. In view of the above circumstances, in this embodiment, there is adopted a configuration in which the inner circumferential portion 40c of the seal member 40 is curved toward the low-pressure space L, as described above. According to the above configuration, in a case in which the pressure in the high-pressure space H increases, the sealing surface 40e of the seal member 40 separates from the outer circumferential surface 3a of the rod 3. The separation of the sealing surface 40e eliminates the friction between the sealing surface 40e and the outer circumferential surface 3a, resulting in the suppression of the temperature increase of the seal member 40. The above actions will be described in detail.

Figure 4:
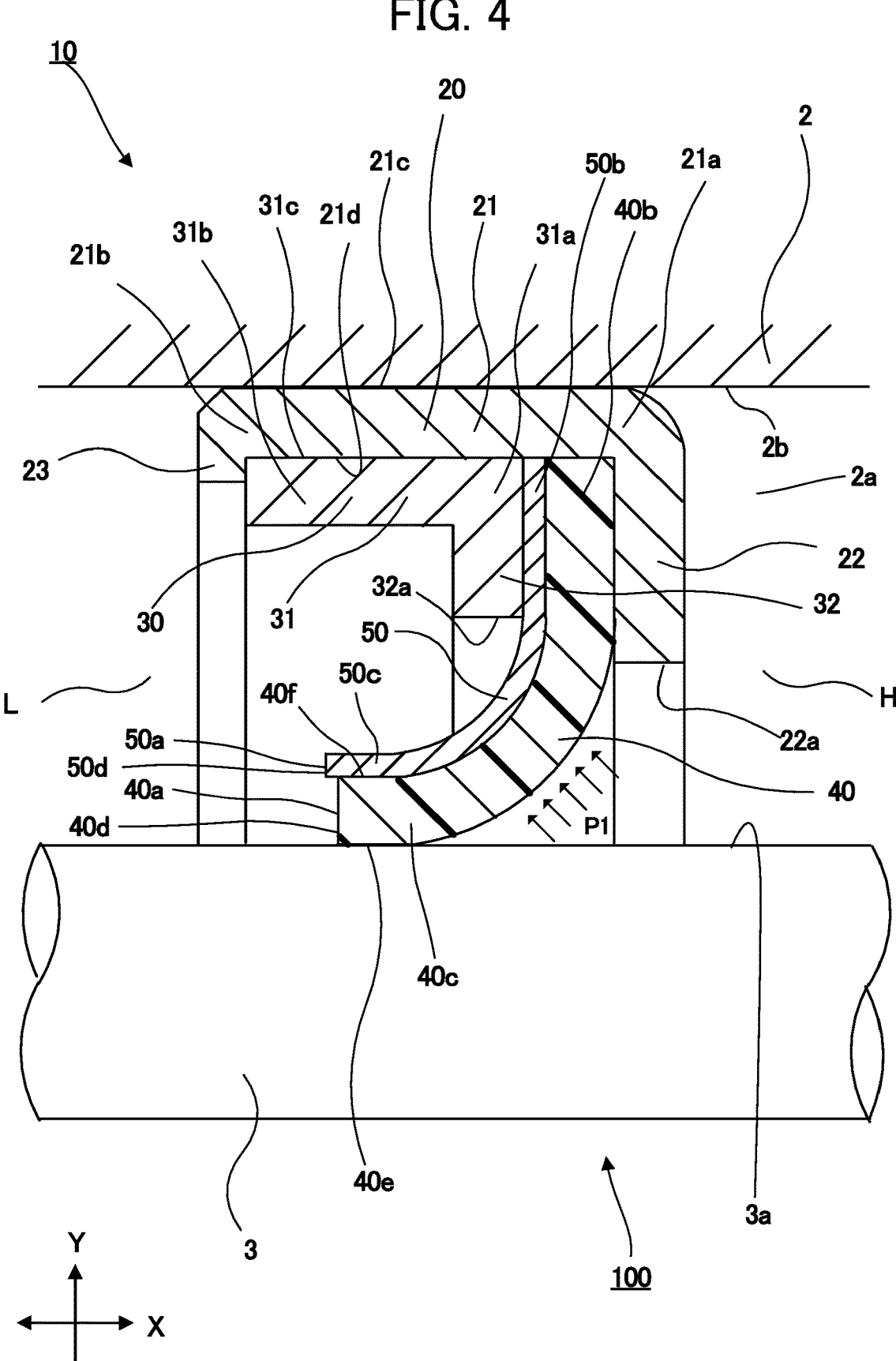
FIG. 4 is a partial cross-sectional view of the sealing device mounted to the rod, showing a state in which the outer circumferential surface of the rod is in contact with the seal member, as a result of a pressure below a reference value being applied.

Referring first to FIG. 4, a state in which the pressure inside the high-pressure space H falls below a reference value PB is described. The pressure inside the high-pressure space H is a first pressure P1, for example. The first pressure P1 is below the reference value PB. In a case in which the first pressure P1 acts on the seal member 40, the sealing surface 40e of the seal member 40 is in contact with the outer circumferential surface 3a of the rod 3. By the action of the first pressure P1, the inner circumferential portion 40c of the seal member 40 is pressed in a direction away from the outer circumferential surface 3a of the rod 3. However, the seal member 40 does not separate from the outer circumferential surface 3a of the rod 3 because the seal member 40 is pressed against the outer circumferential surface 3a of the rod 3 by the plate spring 50. The force of the plate spring 50 pressing the seal member 40 toward the rod 3 exceeds the force of the first pressure P1 pushing the seal member 40 up. Therefore, the seal member 40 is maintained in a state in which the sealing surface 40e of the inner circumferential portion 40c is in contact with the outer circumferential surface 3a of the rod 3. In this case, leakage of the internal gas from the high-pressure space H into the low-pressure space L is less than that in a case in which the internal pressure of the high-pressure space H exceeds the reference value PB. The leakage from the high-pressure space H into the low-pressure space L may be very small. Even in a case in which the seal member 40 does not separate from the outer circumferential surface 3*a* of the rod 3, the pressure inside the high-pressure space H is acting on the seal member 40, so a force is acting in the direction of pushing the seal member 40 up. Thus, the sliding resistance between the seal member 40 and the rod 3 is reduced to an extent that the force in the direction of pushing up the seal member 40 is acting. The sealing device 10 can reduce the sliding resistance while keeping the seal member 40 in contact with the rod 3. The sealing device 10 can reduce the sliding resistance while suppressing leakage of internal gas from the high-pressure space H into the low-pressure space L.

Figure 5:
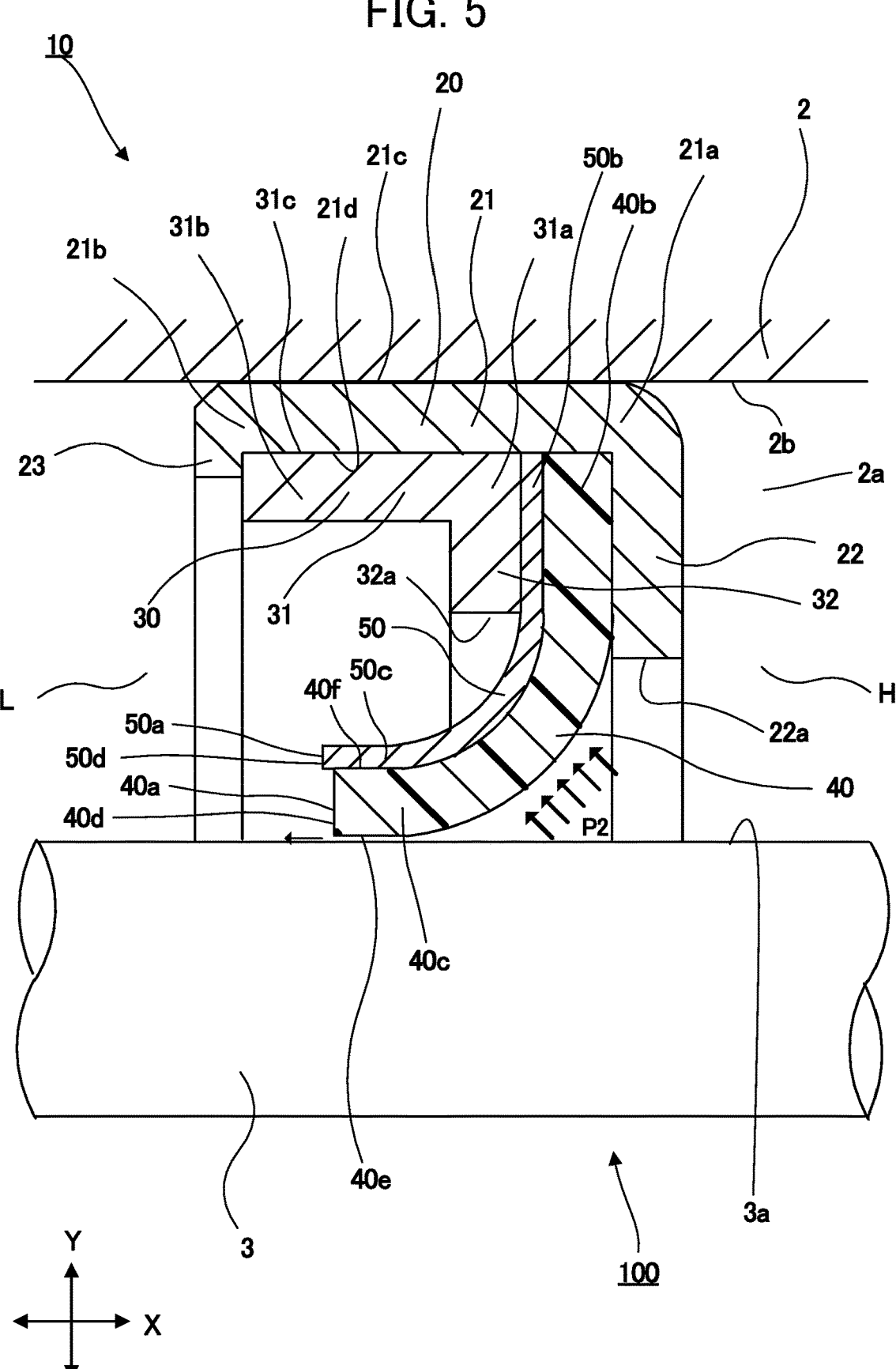
FIG. 5 is a partial cross-sectional view of the sealing device mounted to the rod, showing a state in which the seal member is separated from the outer circumstantial portion of the rod, as a result of a pressure exceeding the reference value being applied.

When the gas in the high-pressure space H is compressed by the rod 3 rotating at high speed, the pressure in the high-pressure space H increases. Referring to FIG. 5, a state in which the pressure inside the high-pressure space H exceeds the reference value PB is explained. The pressure inside the high-pressure space H is a second pressure P2, for example. The second pressure P2 is higher than the first pressure P1. The second pressure P2 exceeds the reference value PB.

In a case in which the second pressure P2 exceeding the reference value PB acts on the seal member 40, the sealing surface 40*e* of the seal member 40 is separated from the outer circumferential surface 3*a* of the rod 3. In other words, the force of the second pressure P2 pushing up the seal member 40 exceeds the force of the plate spring 50 pressing the seal member 40 against the rod 3. By the second pressure P2 acting from the high-pressure space H, the inner circumferential portion 40*c* of the seal member 40 is pushed in a direction away from the outer circumferential surface 3*a* of the rod 3, resulting in deformation of the seal member 40. As a result, the sealing surface 40*e* separates from the outer circumferential surface 3*a* of the rod 3, allowing the internal gas to leak from the high-pressure space H to the low-pressure space L. The internal gas in the high-pressure space H flows out through the gap between the sealing surface 40*e* of the seal member 40 and the outer circumferential surface 3*a* of the rod 3 and into the low-pressure space L. The seal member 40 may temporarily separate from the outer circumferential surface 3*a* of the rod 3 in a case in which a pressure exceeding the reference value PB is applied.

The internal gas of the high-pressure space H flows out to the low-pressure space L, which causes the pressure inside the high-pressure space H to decrease. When the pressure inside the high-pressure space H falls below the reference value PB, the seal member 40 is pushed by the plate spring 50 and enters in contact with the outer circumferential surface 3*a* of the rod 3.

In the sealing device 10, in a case in which the pressure inside the high-pressure space H increases and exceeds the reference value PB, the seal member 40 deforms and the sealing surface 40*e* of the seal member 40 separates from the outer circumferential surface 3*a* of the rod 3. Therefore, the pressure in the high-pressure space H can be released to the low-pressure space L. As a result, an excessive pressure increase in the high-pressure space H can be suppressed.

As described above, in the seal structure 100, in the case in which the pressure inside the high-pressure space H exceeds the reference value PB, the sealing surface 40*e* of the seal member 40 deforms to separate from the outer circumferential surface 3*a* of the rod 3. Therefore, the friction between the sealing surface 40*e* and the outer circumferential surface 3*a* is eliminated by the separation of the sealing surface 40*e*, resulting in the suppression of the temperature increase of the seal member 40. Thus, according to this embodiment, the sealing performance can be sufficiently maintained in a case in which the pressure inside the high-pressure space H is below the reference value PB, while the excessive temperature increase of the seal member 40 can be suppressed in a case in which the pressure inside the high-pressure space H exceeds the reference value PB. As described above, in a configuration in which the rod 3 rotates at high speed in the poorly lubricated environment, the temperature increase of the seal member 40 is particularly notable. Therefore, this embodiment, in which the sealing surface 40*e* is separated from the rod 3 when the pressure inside the high-pressure space H increases, is particularly effective.

In the sealing device 10, the sealing surface 40*e* of the seal member 40 deforms to separate from the outer circumferential surface 3*a* of the rod 3, thereby reducing the sliding resistance between the seal member 40 and the rod 3. In the sealing device 10, the seal member 40 is separated from the outer circumferential surface 3*a* of the rod 3 so that the sliding resistance between the seal member 40 and the rod 3 does not exceed a certain value, thereby enabling avoidance of an increase in sliding resistance. In the sealing device 10, by reducing the sliding resistance, heat generation can be suppressed and occurrence of permanent strain due to creep can be suppressed. In the sealing device 10, the pressure inside the high-pressure space H is maintained appropriately, thereby suppressing instances of damage of the housing 2 having the high-pressure space H.

When the sealing device 10 is in use, pressure is applied to the high-pressure space H. An apparatus equipped with the sealing device 10 may have a pressure-boosting mechanism to increase the pressure of the high-pressure space H. The pressure-boosting mechanism can apply pressure to the interior of the high-pressure space H. By increasing the pressure inside the high-pressure space H so that the pressure inside the high-pressure space H exceeds the reference value PB, the seal member 40 may be deformed so that the sealing surface 40*e* of the inner circumferential portion 40*c* is separated from the outer circumferential surface 3*a* of the rod 3. This reduces the sliding resistance between the sealing surface 40*e* of the seal member 40 and the outer circumferential surface 3*a* of the rod 3, thereby suppressing wear of the seal member 40.

According to the sealing device 10 as described in the foregoing, since the inner circumferential portion 40*c* of the seal member 40 projects toward the low-pressure space L, the pressure inside the low-pressure space L, not the pressure inside the high-pressure space H, acts on a surface 40*f* outside the inner circumferential portion 40*c*. This prevents excessive tightening by the inner circumferential portion 40*c* of the seal member 40. Therefore, sliding heat generation can be suppressed and the increase in torque to rotate the rod 3 can be suppressed. By suppressing sliding heat generation, the occurrence of creep in the inner circumferential portion 40*c* can be suppressed. In the sealing device 10, by suppressing the occurrence of permanent strain due to creep, the sealing performance is maintained and product life is extended.

In the sealing device 10, when the sealing device 10 is in use, and in a case in which the pressure inside the high-pressure space H exceeds the reference value PB, the contact pressure between the sealing surface 40*e* of the inner circumferential portion 40*c* of the seal member 40 and the outer circumferential surface 3*a* of the rod 3 can be adjusted to be decreased by deforming the seal member 40. As a result, it is possible to suppress the wear in the seal member 40 and also the increase in torque to rotate the rod 3. By reducing the frictional resistance between the seal member 40 and the rod 3, heat generation in the seal member 40 can be suppressed and permanent strain due to creep of the seal member 40 can be suppressed. As a result, the sealing performance by the sealing device 10 can be maintained and reliability can be improved.

According to the sealing device 10, a low torque of the rod 3 can be achieved by adjusting the force exerted on the inner circumferential portion 40c in the direction toward the outer circumferential surface 3a of the rod 3 and the pressure applied to the high-pressure space H. Even when the sealing device 10 is in use in a harsh environment of high-speed rotation and poor lubrication, the sealing device 10 can suppress creep of the inner circumferential portion 40c due to sliding heat generation, thereby ensuring sealing performance and extending product life.

In the sealing device 10, the cylindrical portion 21 of the outer ring 20 projects farther toward the low-pressure space L than the seal member 40. In the radial direction Y, the seal member 40 is arranged radially inward of the outer ring 20. In the sealing device 10, in the axial direction X, the seal member 40 does not project from the cylindrical portion 21, thus reducing the risk of the seal member 40 hitting another object. This prevents mechanical damage to the seal member 40.

In the sealing device 10, the flange 22 near the high-pressure space H projects farther toward the outer circumferential surface 3a of the rod 3 than the flange 32 close to the low-pressure space L. This allows the seal member 40 to bend more easily toward the low-pressure space L.

In the sealing device 10, the inner circumferential portion 40c of the seal member 40 is pressed against the outer circumferential surface 3a of the rod 3 by the plate spring 50. Therefore, even though the inner circumferential portion 40c is deformed by the pressure exceeding the reference value PB, the probability of excessive deformation of the inner circumferential portion 40c is reduced. In other words, due to the inner circumferential portion 40c being pressed by the plate spring 50, the inner circumferential portion 40c can be deformed within a moderate range. As described above, the probability of excessive separation of the sealing surface 40e from the outer circumferential surface 3a of the rod 3 is reduced. In other words, excessive expansion of the gap between the sealing surface 40e and the outer circumferential surface 3a is suppressed. Therefore, the probability is reduced of an excessively large amount of gas flowing out from the high-pressure space H into the low-pressure space L. There is another advantage that the sealing performance can be maintained by the pressure from the plate spring 50 even in the state in which the elasticity of the seal member 40 has decreased over time.

In the sealing device 10, the degree of deformation of the seal member 40 can be set by setting the plate thickness of the plate spring 50 appropriately. The degree of deformation of the seal member 40 can also be varied by changing the number of slits 51 in the plate spring 50. The degree of deformation of the seal member 40 can be set by setting the thickness of the seal member 40 appropriately.

Next, the sealing device according to a conventional technique will be described. In the sealing device according to the prior art, the seal member is curved so that it projects toward the high-pressure space H. A portion of the seal member adjacent to the rod 3 projects farther toward the high-pressure space H than a portion of the seal member distant from the rod 3. In this case, the portion of the seal member adjacent to the rod 3 is pressed against the outer circumferential surface 3a of the rod 3 by the pressure inside the high-pressure space H. In the sealing device according to the prior art, in a case in which the pressure inside the high-pressure space H increases, the portion of the seal member adjacent to the rod 3 is pushed toward the outer circumferential surface 3a of the rod 3. Therefore, as the pressure in the high-pressure space H increases, the seal member is pressed against the rod 3 with greater force, so that the seal member does not separate from the outer circumferential surface 3a of the rod 3.

In contrast, in the sealing device 10 of this embodiment, the seal member 40 is curved so that it projects toward the low-pressure space L. The inner circumferential portion 40c, which is a portion of the seal member 40 adjacent to the rod 3, is pushed away from the outer circumferential surface 3a of the rod 3 when the pressure inside the high-pressure space H increases, as shown in FIG. 5. In other words, in the sealing device 10, when the pressure inside the high-pressure space H increases, the seal member 40 deforms to separate from the outer circumferential surface 3a of the rod 3, unlike the prior art. The sealing device 10 allows the internal gas of the high-pressure space H to leak out into the low-pressure space L. In the sealing device 10, in the case in which the pressure inside the high-pressure space H increases and exceeds the reference value PB, the seal member 40 separates from the rod 3, thereby eliminating friction between the seal member 40 and the rod 3. Therefore, the temperature increase of the seal member 40 caused by the friction between the seal member 40 and the rod 3 is suppressed. In addition, the sealing device 10 can reduce the pressure of the high-pressure space H, and also the sliding resistance between the seal member 40 and the rod 3 in the case in which the pressure inside the high-pressure space H exceeds the reference value PB.

The amount of internal gas leakage from the high-pressure space H into the low-pressure space L is the amount of leakage that does not interfere with the operation of an apparatus having the rod 3. The amount of internal gas leakage from the high-pressure space H to the low-pressure space L may be such that it does not significantly affect the environment of the low-pressure space L.

The above-described embodiment is merely representative forms of the present invention. The present disclosure is not limited to the above-described embodiment, and various modifications and additions are possible as long as they do not depart from the gist of the present disclosure.

(1) In the above embodiment, the sealing device 10 is configured with a plate spring 50, but the sealing device 10 may be configured without a plate spring 50. In the above embodiment, the seal member 40 is mounted to the outer ring 20 using the inner ring 30, but the seal member 40 may be mounted to the outer ring 20 using another member.

(2) The above embodiment shows an example of a configuration in which the seal member 40 separates from the outer circumferential surface 3a of the rod 3 in the case in which the pressure of the high-pressure space H exceeds the reference value PB. However, even if the pressure of the high-pressure space H exceeds the reference value PB, the seal member 40 may not separate from the outer circumferential surface 3a of the rod 3. For example, even if the pressure in the high-pressure space H exceeds the reference value PB, the seal member 40 may remain in contact with the outer circumferential surface 3a of the rod 3 if the pressure difference between the high-pressure space H and the low-pressure space L is small. Even if the seal member 40 is in contact with the rod 3, the pressure of the high-pressure space H acts in the direction of pushing up the seal member 40, so that the sliding resistance between the seal member 40 and the rod 3 is reduced.

(3) In the above embodiment, a form in which the high-pressure space H is filled with gas is illustrated, but the fluid filled in the high-pressure space H may be a liquid, or be a fluid which is a mixture of a liquid and a gas. However, in the configuration in which the gas filled in the high-pressure space H is sealed by the sealing device 10, the temperature increase of the seal member 40 when the rod 3 rotates at a high speed is particularly notable. Therefore, the present invention is particularly effective in a configuration in which the high-pressure space H is filled with gas (i.e., the sealing device 10 seals in the gas).

(4) Although the above embodiment assumes a poorly lubricated environment, lubricating oil may be supplied to the sealing device 10. The lubricating oil may be supplied from the high-pressure space H, or from the low-pressure space L, for example. The lubricating oil may be present between the inner circumferential portion 40c of the seal member 40 and the outer circumferential surface 3a of the rod 3. The lubricating oil may be present in the gap between the sealing surface 40e of the seal member 40 and the outer circumferential surface 3a of the rod 3. When the sealing surface 40e is separated from the outer circumferential surface 3a of the rod 3, the lubricating oil present inside the high-pressure space H can enter the gap between the seal member 40 and the rod 3. In the sealing device 10, the increase in frictional resistance can be suppressed, and the increase in torque of the rod 3 can be suppressed.

(5) In the above embodiment, the seal member 40 is supported by the outer ring 20 and the inner ring 30, but the structure for supporting the seal member 40 is not limited to the above examples. For example, the seal member 40 may be supported by an annular member that integrates the outer ring 20 and the inner ring 30. For example, the seal member 40 may be supported by an annular member with the outer circumferential surface of the seal member 40 in contact with the inner circumferential surface 2b of the housing 2.

(6) In the above embodiment, the case in which the seal member 40 does not project from the outer ring 20 in the axial direction X is illustrated, but the sealing device 10 is not limited thereto. In the axial direction X, the seal member 40 may project from the outer ring 20.

What is claimed is:

1. A seal structure comprising: a rotatable rod: a housing with an opening through which the rod is to be inserted; and a sealing device arranged between a high-pressure space and a low-pressure space next to each other along an axis of the rod inside the housing, and configured to seal a gap between an outer circumferential surface of the rod and an inner circumferential surface of the opening, wherein: the sealing device comprises: an annular member mounted to the housing, an annular seal member fixed to the annular member, and an annular plate spring that is in contact with the seal member, the seal member has an inner circumferential portion adjacent to the rod, the inner circumferential portion is curved toward the low-pressure space, and a sealing surface of the inner circumferential portion in the curved state, the sealing surface facing the rod, is in contact with the outer circumferential surface of the rod, the plate spring presses the inner circumferential portion against the outer circumferential surface of the rod, with the plate spring curved along the seal member and contacting the seal member throughout its length until extending past a terminal end of the inner circumferential portion, and an inner circumferential surface of the plate spring projects further toward the low-pressure space than the inner circumferential surface of the seal member in a direction that extends in parallel with the outer circumferential surface of the rod.

2. The seal structure according to claim 1, wherein the seal member deforms such that the sealing surface separates from the outer circumferential surface of the rod in a case in which a pressure inside the high-pressure space exceeds a reference value.

3. The seal structure according to claim 1, wherein:
the annular member has a cylindrical portion extending along an axial direction of the rod, and
the cylindrical portion projects farther toward the low-pressure space than the seal member.

4. The seal structure according to claim 1, further comprising a mounting member configured to fix the seal member to the annular member,
wherein:
the annular member has a flange projecting toward the outer circumferential surface of the rod,
of the seal member, an outer circumferential portion adjacent to the housing is fixed between the flange and the mounting member in an axial direction of the rod,
the flange is closer to the high-pressure space than the seal member,
the mounting member is closer to the low-pressure space than the seal member, and
an inner circumferential surface of the flange is closer to the outer circumferential surface of the rod than an inner circumferential surface of the mounting member.

5. A sealing method that uses
a rotatable rod,
a housing with an opening through which the rod is to be inserted,
a seal member arranged between a high-pressure space and a low-pressure space next to each other along an axial direction of the rod inside the housing, the seal member having an inner circumferential portion adjacent to the rod, and
an annular plate spring that is in contact with the seal member and presses the inner circumferential portion against an outer circumferential surface of the rod, wherein the plate spring is curved along the seal member and contacting the seal member throughout its length until extending past s terminal end of the inner circumferential portion such that an inner circumferential surface of the plate spring projects further toward the low-pressure space than the inner circumferential surface of the seal member in a direction that extends in parallel with the outer circumferential surface of the rod,
the sealing method comprising:
in a case in which a pressure inside the high-pressure space is below a reference value, sealing a gap between an outer circumferential surface of the rod and an inner circumferential surface of the opening by maintaining the seal member in a state in which, of the seal member, the inner circumferential portion adjacent to the rod is curved toward the low-pressure space, and in which a sealing surface of the inner circumferential portion in the curved state, the sealing surface facing the rod, is in contact with the outer circumferential surface of the rod, and
in a case in which the pressure inside the high-pressure space exceeds the reference value, separating the sealing surface from the outer circumferential surface of the rod by pressing the sealing surface of the inner circumferential portion by the pressure inside the high-pressure space.

6. The sealing method according to claim 5, wherein the pressure inside the high-pressure space increases as a rotation speed of the rod increases.

7. The seal structure according to claim 1, wherein:
an outer circumferential portion of the plate spring is fixed to the annular member, and
the inner circumferential portion of the plate spring is curved along the seal member and movable to the annular member.

\* \* \* \* \*